United States Patent [19]

Tanioka et al.

[11] Patent Number: 4,646,249

[45] Date of Patent: Feb. 24, 1987

[54] IMAGE PROCESSING SYSTEM

[75] Inventors: Hiroshi Tanioka, Tokyo; Tadashi Yamakawa, Yokohama; Yutaka Inoue, Urawa; Masao Hosaka, Sagamihara; Toshiaki Yagasaki, Hino; Nobuhiro Kasama, Yokohama; Mitsuru Kurata, Kawasaki, all of Japan

[73] Assignee: Canon Kabushiki Kaisha, Tokyo, Japan

[21] Appl. No.: 619,112

[22] Filed: Jun. 11, 1984

[30] Foreign Application Priority Data

Jun. 16, 1983 [JP] Japan ................................ 58-108489
Jul. 26, 1983 [JP] Japan ................................ 58-136204
Jul. 26, 1983 [JP] Japan ................................ 58-136205

[51] Int. Cl.$^4$ ...................... G03G 15/00; G06F 15/66
[52] U.S. Cl. .................................... 364/518; 355/3 R; 355/5; 355/18; 358/244; 358/256; 364/525
[58] Field of Search ............... 364/518, 521, 525; 355/18, 20, 40, 3 R, 5; 358/256, 230, 244; 354/5, 106

[56] References Cited

U.S. PATENT DOCUMENTS

| 4,033,687 | 7/1977 | Hirayama et al. | 355/20 X |
|---|---|---|---|
| 4,080,058 | 3/1978 | Stephany et al. | 355/20 X |
| 4,110,794 | 8/1978 | Lester et al. | 355/40 X |
| 4,134,668 | 1/1979 | Coburn | 355/20 X |
| 4,194,833 | 3/1980 | Lester et al. | 354/5 X |
| 4,217,046 | 8/1980 | Weinstein et al. | 354/106 X |
| 4,251,153 | 2/1981 | Levine | 355/5 X |
| 4,438,453 | 3/1984 | Alston | 358/244 X |
| 4,482,919 | 11/1984 | Alston et al. | 358/244 X |
| 4,504,868 | 3/1985 | Hasuike et al. | 358/256 X |
| 4,536,081 | 8/1985 | Gell | 355/20 |

Primary Examiner—Felix D. Gruber
Attorney, Agent, or Firm—Fitzpatrick, Cella, Harper & Scinto

[57] ABSTRACT

There is disclosed an image processing system, particularly, for use in a copying machine with a display. This apparatus comprises a liquid crystal display panel on an original presser plate; a panel copy mode to perform the image processing with respect to the screen display; an ordinary copy mode to perform the image processing with respect to an ordinary original; a high gradient processor to perform the image processing of high gradient; a low gradient processor to perform the image processing of low gradient; and a switching circuit to switch the high gradient processor and low gradient processor in accordance with the panel copy mode and ordinary copy mode. The image processings with different gradients can be executed depending upon the states and kinds of originals, so that an appropriate copy of the display panel or ordinary original can be always provided.

36 Claims, 9 Drawing Figures

FIG. 8

IMAGE PROCESSING SYSTEM

BACKGROUND OF THE INVENTION

1. Field of the Invention

The present invention relates to an image processing system in which the proper image processing can be always performed irrespective of the states and kinds of images.

2. Description of the Prior Art

In association with an image processing apparatus, e.g., copying machine, an image processing system is considered which is connected to other equipment such as a computer or the like or which has a function for transmission of an image to other outputting apparatus. For example, a system having both display and printer functions has been proposed whereby it is possible to copy not only an ordinary original, i.e. from a hard copy or some such document, but also an original iamge displayed on a display device or the like, for example, outputs of a computer and the like by turning down the display screen of the display device on an original base. However, in the case of copying, e.g., the display screen of the liquid crystal display device by turnig it down on the original base, only a copy whose whole surface is black can be obtained because of the small amount of light reflected from the liquid crystal display. Even when the density adjusting lever is moved to raise the density, the entire surface of the resulting copy is still black. In order to cope with this, therefore, if such a system is constituted in the manner such that the image of the liquid crystal display device can be clearly copied when the density is increased by moving the density adjusting lever, the traveling width of the lever in adjustment of the density of an ordinary original will have become small. In addition, in the case where a volume or the like is used in place of the lever for continuous adjustment of the density, there is a drawback such that the variable width of the movable portion for use in the density adjustment in the density adjusting mechanism has to be set to an extremely large value. Also, even when ordinary originals are used, a similar drawback occurs in the cases where the original has very high reflectance and where the dark original is copied, and the like.

On the other hand, in a case where the system of this type is used as an ordinary copying machine to copy ordinary originals, the tone of the image copied is preferably set to the soft tone in order to obtain not only good reproductivity of the line original but also satisfactory reproduction of the photograph original. In case of copying the display data of the liquid crystal panel or the like as an original, it is desirable that the image tone is the hard tone since each pixel fundamentally has substantially only two gradations representing black or white.

Further, in the case of a digital copying machine which reads an image by CCDs and the like, the equipment having the display function to which the function for processing the image data of the display section thereof and the function for transmitting the image signal thereof were further added can be considered. However, the normal completion of the copy cannot be confirmed on the transmitting side in the case where the image data is transmitted and a desired image is copied through the display section on the transmitted side in addition to the case where the output as the ordinary copying machine is inconvenient as described above.

Thus, there may occur a situation whereby the appropriate image transmission cannot be attained and there are problems such that this may cause a reduction in system efficiency and a decrease in operation efficiency.

SUMMARY OF THE INVENTION

It is an object of the present invention to eliminate the above-mentioned drawbacks in consideration of such points.

It is another object of the invention to provide an image processing system which can perform the appropriate image processing irrespective of the states and kinds of originals.

It is still another object of the invention to construct an image processing system having an image processing apparatus which can perform the proper image processing irrespective of the states and kinds of originals.

A further object of the invention is to provide an image processing system which performs image processing with different gradients in accordance with the states and kinds of originals.

An additional object of the invention is to provide an image processing system having switching means for performing image processing with different gradients in accordance with the states and kinds of originals.

A still further object of the invention is to provide an image processing system whereby the panel copy function to copy the display panel is added to the function of the analog copying machine and the control means for outputting an appropriate image even when either case is provided for this system.

A specific object of the invention is to provide an image processing system whereby the panel copy function to copy the display panel is added to the function of the original copying machine and the control means for outputting a suitable image even when either case is provided for this system.

A more specific object of the invention is to provide an image processing system having the transmitting function and the panel copy function to copy the display panel.

Another specific object of the invention is to provide an image processing system having the switching means for switching the image processing operations in accordance with the states and kinds of originals.

Another object of the invention is to provide an image processing system which can adjust the density of the output image with a similar scale irrespective of the states and kinds of originals.

A further object of the invention is to provide an image processing system which can adjust an amount of light of the light source for exposing an original in accordance with the states and kinds of originals.

BRIEF DESCRIPTION OF THE DRAWINGS

FIG. 2-1 illustrates a constructional cross sectional view of an image processing apparatus of the digital read type;

FIG. 2-2 illustrates a constructional cross sectional view of an image processing apparatus of the analog read type;

DETAILED DESCRIPTION OF THE INVENTION

The present invention will now be described in detail hereinbelow with reference to the drawings.

Figure 1:
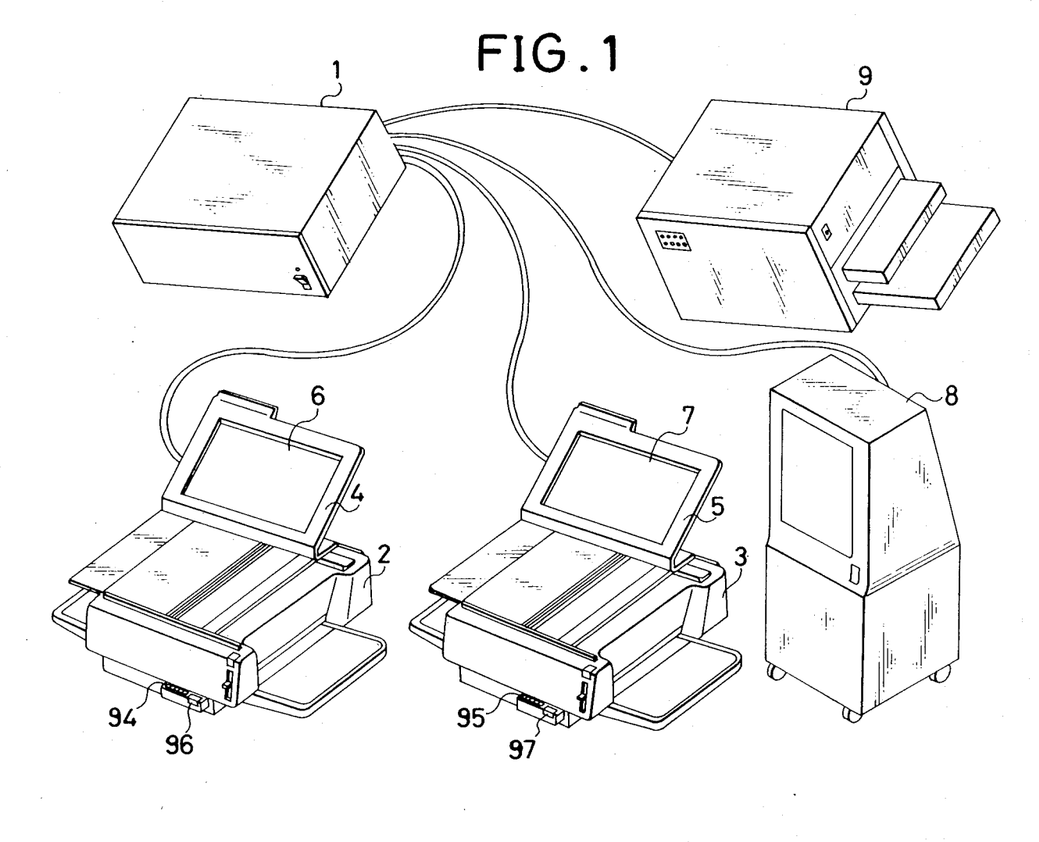
FIG. 1 illustrates an external view of an image processing system.

FIG. 1 is an external view showing an image processing system. A reference numeral 1 denotes a system control unit such as a computer which can control the transmission among respective equipment, or a multi-input/multi-output control unit, or a retention memory unit which can store and output an image data, etc. In FIG. 1, numerals 2 and 3 represent main bodies of image processing apparatus each having at least the display and copy functions, respectively, and 4 and 5 are original presser plates on the surface of which display panels 6 and 7 are arranged. In addition, although the display panel is the liquid crystal display panel in this embodiment, it is not limited to this. Also, an optical system for correction of a focal point (for instance, a glass plate is interposed in the exposure path) may be provided. A display unit 8 such as a CRT or the like displays outputs of the image processing apparatus, computers, etc. An output printer 9 such as an LBP or the like outputs the data of the computers, etc. In addition, the connecting arrangement of these apparatuses is not limited to the connection shown.

Figure 21:
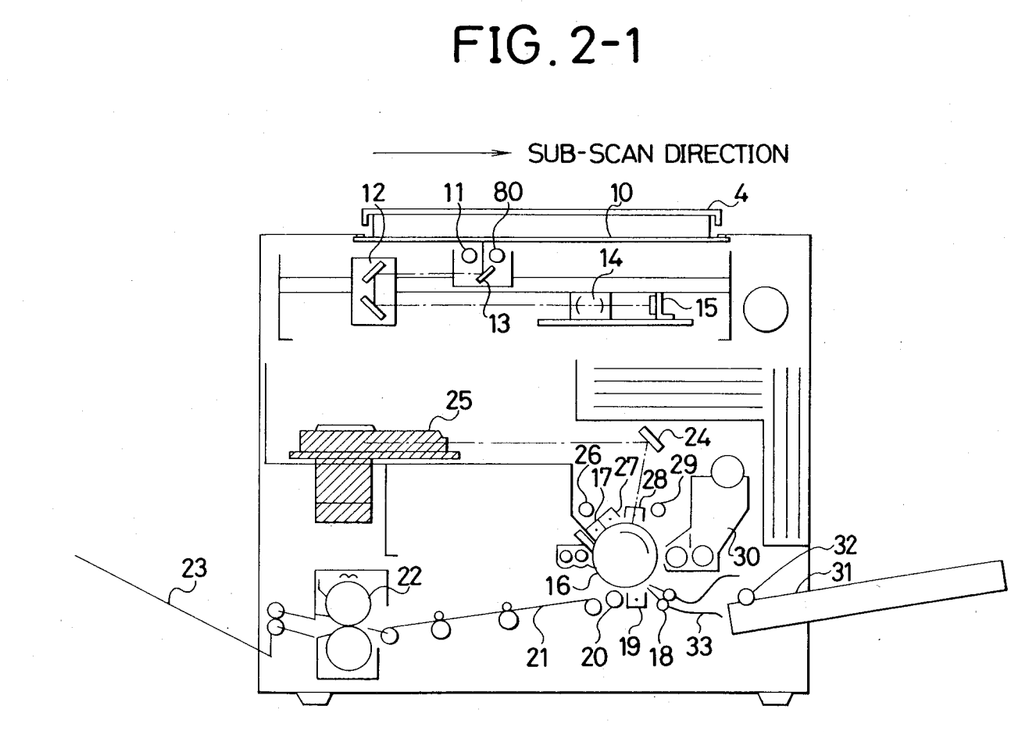

Referring now to FIG. 2-1, there is illustrated a constructional cross sectional view of the image processing apparatus 2 (of the CCD read type) shown in FIG. 1. An original is placed with face down on an original glass 10 and the standard position for placing the original is located in the left inner part with respect to the front side. The original is pressed onto the original glass by the original cover 4. The original is illuminated by a fluorescent lamp (or halogen lamp) 11 or 80 and the optical path is formed so that the light reflected from the original passes through mirrors 12 and 13 and a lens 14 and is focused onto the surface of a CCD 15. These mirrors 12 and 13 are moved at the relative velocities of 2:1. This optical unit is moved from the left to the right at a constant velocity while being applied with the PLL control by a DC servomotor . This moving velocity is set to 180 mm/sec. in the going route where the original is illuminated and is set to 468 mm/sec. in the returning route. The resolution in this subscanning direction is 16 lines/mm. The originals of sizes A5 to A3 can be processed and the originals of A5, B5 and A4 sizes are placed in the longitudinal direction, while the originals of sizes B4 and A3 are placed in the lateral direction. The optical unit is returned in dependence upon the original size; namely, a signal VIDEO ENABLE of a reader is counted through an image tip sensor (which will be described later) and when it becomes a count value corresponding to the original size, the optical unit is returned. Also, scanning of the original may be performed by an apparatus of the original base moving type.

For the main scanning direction, the width of the main scanning is set to the maximum lateral width of 297 mm of the original of the A4 size in accordance with the above-mentioned placing direction of the original. To resolve this at 16 pel/mm, 4752(=297×16) bits are needed as the number of bits of the CCD; therefore, in this apparatus, two DDC array sensors of 2688 bits are used and are driven in parallel. Thus, the main scanning period (=accmulating time of the CCD) T becomes T=1/(v·n)=1/(180×16)=347.2 μsec. under the conditions of 16 lines/mm and 180 mm/sec. The transferring velocity f of the CCD becomes f=N/T=2628/347.2 μsec.=7.7419 NHz.

The bit-serial image signal which was processed in the reader section is input to a laser scan optical system unit 25 of the printer. This unit comprises a semiconductor laser, collimator lens, polyhedron mirror of revolution, Fθ lens, and a fall-down correction optical system. The image signal from the reader is applied to the semiconductor laser and is electric/photo converted. The laser light radiated is deflected as the parallel light by the collimator lens. Then, this parallel light is irradiated onto the polyhedron mirror which is rotating at a high speed, thereby scanning the laser beam on a photosensitive medium 16. This polyhedron mirror is rotated at the rotating speed of 2600 r.p.m. The scanning width is about 400 mm and the effective image width is 297 mm corresponding to the lateral dimension of an A4 original. The frequency of the signal which is applied to the semiconductor laser at this time is therefore approximately 20 NHz (NRz). The laser beam from this optical unit enters the photosensitive medium 16 through a mirror 24.

This photosensitive medium 16 consists of, for example, three layers of a conductive layer, a photosensitive layer and an insulative layer; however, it is not limited to this. Therefore, a process component which enables an image to be formed on this medium is arranged.

In FIG. 2-1, a reference numeral 17 denotes a pre-deelectrifier; 26 is a pre-deelectrifying lamp; 27 a primary electrifier; 28 a secondary electrifier; 29 a front exposing lamp; 30 a developing apparatus; 31 a paper feed cassette; 32 a paper feed roller; 33 a paper feed guide; 18 a resist roller; 19 a transfer electrifier; 20 a separating roller; 21 a carrier guide; 22 a fixing device; and 22 a tray. The velocities of the photosensitive medium 16 and carrying system are 180 mm/sec. which is the same as that in the going route of the reader. Therefore, the copying speed when the original is copied by use of the combination of the reader and printer is 30 sheets/min in the case of A4 size. In addition, the printer uses a separating belt on this side of the photosensitive drum to separate the copy paper closely attached thereon; thus, the image corresponding to the width of that belt is emitted. If the image signal is also transmitted on the signal line with respect to the portion corresponding to the above-mentioned belt width, the image data of that portion will have been developed. Thus, the separating belt becomes dirty due to the toner and the following papers also will have become dirty. Therefore, with regard to this separating belt width of 8 mm, the video electrical signal of the print output is preliminarily cut in the reader section. On the other hand, if the toner is attached to the head of the copy paper, the paper will be wrapped around the fixing roller when the toner is fixed causing a paper jam. Accordingly, the electrical signal is also similarly preliminariy cut by the reader section to prevent the toner from being attached on the head of the paper corresponding to only the width of 2 mm thereof.

The panel copy, the purpose of which is to copy the display section will now be explained. In the case of the display panel copy as well, as shown in FIG. 1, mode change-over switches 34 and 35 are provided to obtain a proper output as in the copy of ordinary originals. In the case of copying images displayed on the display panels 6 and 7, the change-over switches 94 and 95 are first turned on or the apparatuses are constructed in a manner such that the change-over switches are automatically turned on by putting down the original presser plates 4 and 5 while the images are displayed on the display panels 6 and 7; thereafter, copy start keys 96 and 97 are turned on to perform the panel copy. In case of the panel copy, since the liquid crystal display panel indicates the image by dots, by setting a read threshold value of the above-mentioned CCD 15 and outputting the binary signal, it is possible to obtain the appropriate outputs similarly as when copying the ordinary original. Further, the development bias and the lamp to expose the original may be variable. The image data can be transmitted, for instance, from the image processing apparatus 2 to 3, or to the display device 8, printer 9, or computer body. This transmitted image can be seen through the display panel 7 of, e.g., the image processing apparatus 3 and if desired, the proper output can be derived by setting the mode change-over switch 35 to the panel copy mode and putting down the original presser plate 5 and then by turning on the copy button 37 in a manner similar to that described above.

Next, the description will be made regarding an instance where the image processing apparatuses 2 and 3 are the analog copying machines. In this case also, the system shown in FIG. 1 can be obviously constructed.

Figure 22:
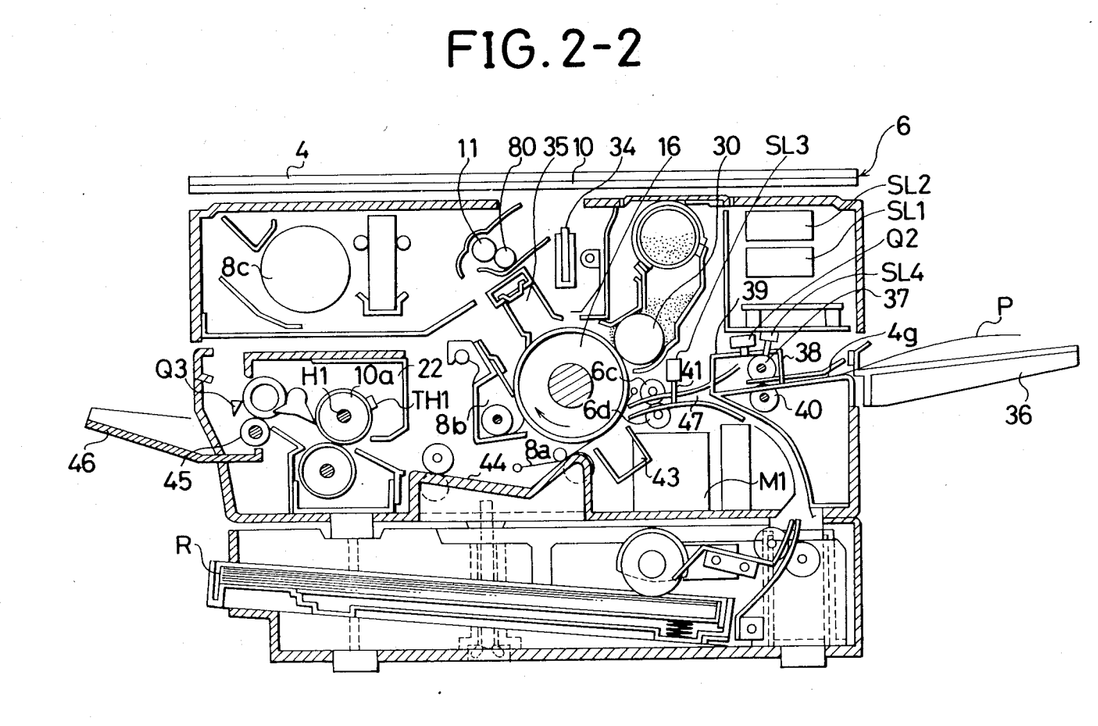

FIG. 2-2 illustrates a constructional cross sectional view of the image processing apparatus as the analog copying machine. The same parts and components as those shown in FIGS. 1 and 2-1 are designated by the same reference numerals. A reference numeral 34 denotes a short focal point small diameter image-forming element array (cylindrical lens) for slit-exposing the reflected original image on the drum 16. A numeral 35 indicates an electrifier. On the other hand, transfer medium P is manually fed from over a manual paper feed base 36. This transfer medium P is then carried in a manner such that when a paper feed sensor Q2 for detecting that the transfer medium P was manually inserted is turned on, a solenoid SL4 is energized and a paper feed roller is 37 which is lways rotating descends near a fixed roller 40, so that the paper is sandwiched and is carried. The sensor Q2 is driven by detecting arms 38 and 39 extending before and behind this paper feed roller 37 and is turned on when either of the arms 38 and 39 is lifted up by the paper. A resist shutter 41 is always located so as to shut off a paper carrying passage 47, so that the head of the paper comes into contact with this shutter 41 and stops. In this way, when the head of the paper is stopped, the paper slips between the rollers 37 and 40 and it is not carried any more. However, the energization to the solenoid SL4 will be stopped after a while. After the solenoid SL4 is again driven, a resist signal is applied to a solenoid SL3, so that the shutter 41 is lifted up and the paper is again carried and is sent to the photosensitive drum 16 by means of rollers 6c and 6d which are always rotating.

Subsequently, the toner image on the photosensitive drum 16 is transferred on the transfer medium P by a transfer electrifier 43. Thereafter, the transfer medium P, removed from the drum 16 by a separating belt 8a, is led to the fixing device 22 by a guide 44. After the toner image on the transfer medium P is fixed by a fixing roller 10a including a halogen heater H1 therein, it is drained on a tray 46 by a paper discharge roller 45.

In addition, Q3 indicates an optical or a mechanical paper discharge sensor and outputs a detection signal when it detects the paper. A thermister TH1 detects the temperature of the fixing roller in the fixing device 22.

The remaining teansfer toner on the drum 16 is cleaned by a cleaner 8b in preparation for the next use. A cooling fan 8c acts to discharge the heated air in the box of the copying apparatus to the outside.

A rack (not shown) is fixed to the lower portion of the mounting base 10 according to this embodiment. The mounting base 10 is moved by rotating a pinion in engagement with this rack. A solenoid SL1 is an original base-stopping solenoid for control of a reverse clutch. A solenoid SL2 is an original base-forwarding solenoid for control of a forwarding clutch. The traveling of the original base is controlled by transferring the rotation of a motor to the pinion through the forward and reverse clutches. Also, R is a paper feed cassette.

The operation of this apparatus will then be described.

The original or liquid crystal panel data placed on the original base is illuminated by the illumination lamp 11. The image information is formed as the reflected light on the surface of the photosensitive medium drum 16 through the cylindrical lens 90. The original base 10 is scanned synchronously with the rotation of the drum 16. Therefore, each dot pixel of the original is projected onto the photosensitive drum. The drum 16 is uniformly charged at a predetermined polarity by the electrifier 91. Then, a potential image which can be developed is formed in the portion corresponding to black of the electrostatic latent image formed by the exposure of the image. This potential image is developed in black by the developing apparatus 30.

Subsequently, the gradient switching control between the ordinary copy function and the panel copy function will be described.

Figure 3:
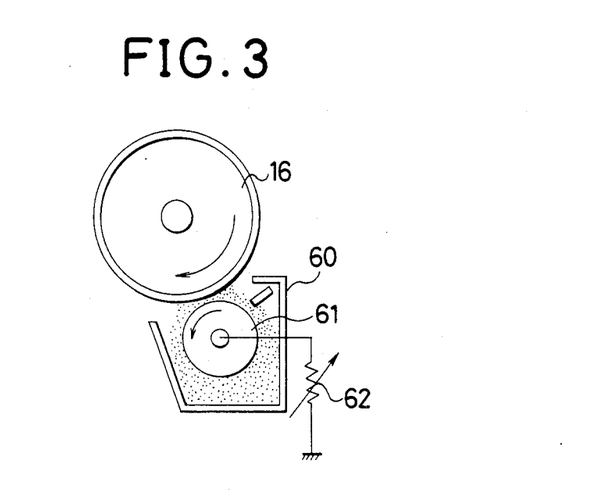
FIG. 3 is a diagrammatic view showing a developing apparatus 30.

FIG. 3 is a diagrammatical view showing the developing apparatus 30 of FIG. 2-2. In the diagram, a numeral 16 is the photosensitive drum; 60 indicates a magnet brush developing apparatus of the sleeve type which uses a developing agent consisting of a mixture of carrier and toner; and 61 is a magnet sleeve (developing roller) which has fixed magnetic poles therein and rotates a non-magnetic cylinder. The magnet brush is formed on the surface of this sleeve. Since the carrier serves as the micro contacting electrode group, this brush has the intermediate gradient image reproductivity with a large electrode effect. In addition, the magnetic toner consisting of single component may be used as the developing agent.

On the other hand, a resistor 62 is connected to the developing roller of the developing apparatus 30 and a resistance value thereof is changed for varying the developing bias, thereby enabling the image reproductivity to be changed.

Figure 4:
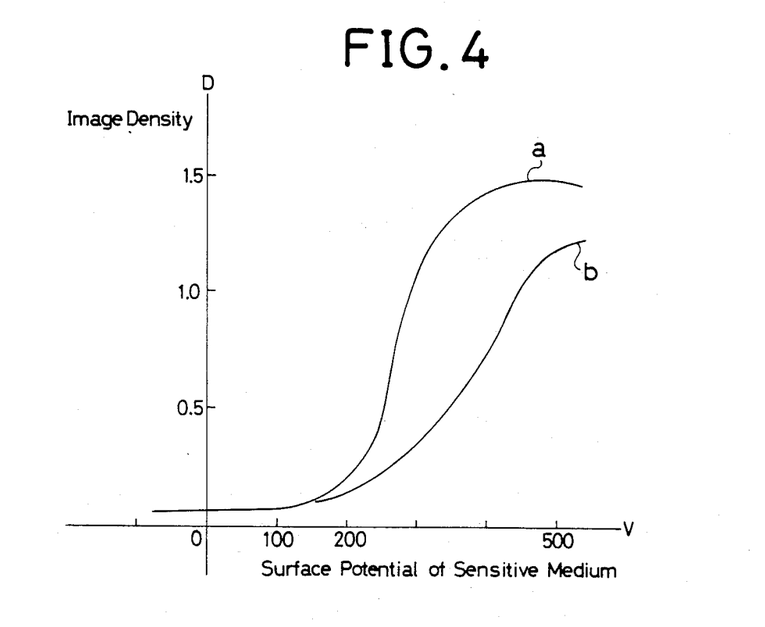
FIG. 4 is a graph showing the V-D characteristic curves representing the gradient in development.

FIG. 4 is a graph showing the gradients in development, namely, a so-called V-D characteristic curve representing the relation between the surface potential of the photosensitive medium and the image density.

For example, as the resistance value is increased when the image is formed, the V-D curve is moved to the right of the V axis (from a to b), so that the inclination in the linear-like region is corrected to a smooth slope. In FIG. 4, the characteristic of curve a is set in the case where the resistance value of the resistor 62 is 0 and in the case of a binary original, namely, in the case of the display panel copy, while, the characteristic of curve b is set in the case where the resistance value is $10^7$ ohms and in the case of an ordinary multigradient original.

Figure 5:
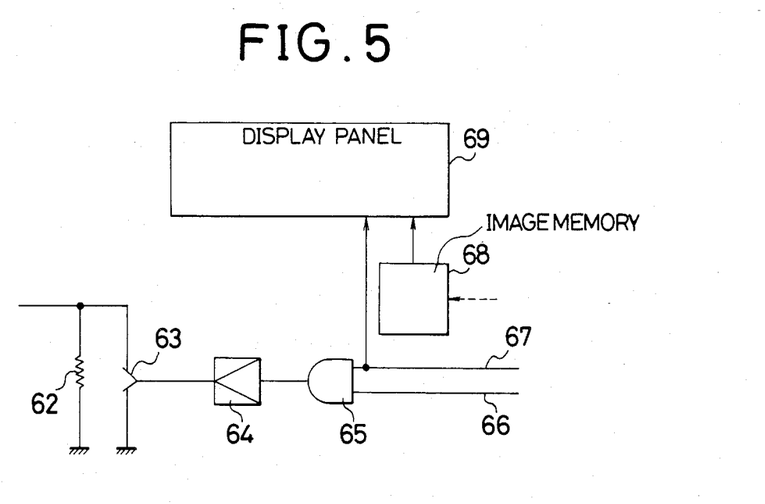
FIG. 5 is a diagram showing a gradient switching circuit.

FIG. 5 shows the gradient switching circuit according to the present invention, in which numeral 68 denotes an image memory wherein characters or image patterns which are displayed by a display panel 69 have been stored. In this memory, the output data from facsimile apparatuses or office computers or proper formats have been generally stored. A signal 67 is used to control the above-mentioned panel. The panel copy mode is detected by an AND gate 65 by getting an AND logic of this signal and a copy command signal 66. An output signal of the AND gate 65 is connected to a driver 64 for controlling a switch 63 which is connected in parallel to the resistor 62 connected to the sleeve of the developing apparatus. Therefore, the switch 63 is turned on in the panel copy mode, so that the image of hard tone is automatically reproduced (a in FIG. 4).

Figure 6:
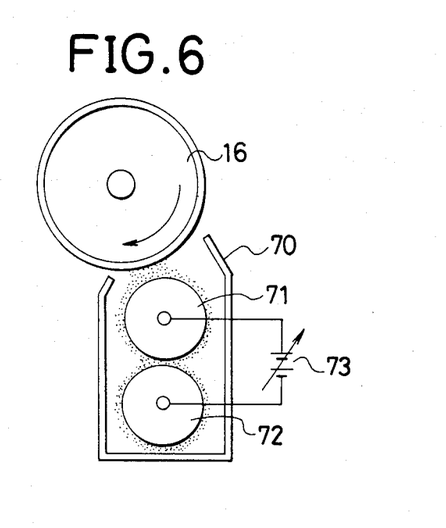
FIG. 6 is a diagram showing another developing apparatus to switch the gradient.

FIG. 6 shows the developing apparatus for switching the gradient according to another method. In a developing apparatus 70, a numeral 71 denotes a developing roller which forms a thin layer of toner on the surface and develops the latent image on the photosensitive drum 16, and 72 is an applicator roller for coating the toner of the surface of the developing roller. By changing a value of a bias voltage 73 between both rollers, the thickness of the toner which is coated on the developing roller surface can be changed, thereby enabling the developing characteristic to be varied. For example, in the case of the panel copy, the bias voltage is set to 600 V and the thickness of coating is set to be relatively thick for providing the hard tone development. On the other hand, in the normal copy mode, the bias voltage is reduced to 450 V and the thickness of toner coating is set to be relatively thin for providing the soft tone development.

In addition, in the case of the jumping development method, by switching the frequency of the AC bias voltage, it is possible to select either the hard tone development (800-1600 Hz) or soft tone development (200-600 Hz).

Also, as shown in FIG. 5, the foregoing switching of the gradient can be easily implemented in a similar manner.

This switching of gradient may be done using the manual switches 34 and 35 shown in FIG. 1 or using a microswitch provided for the presser plate or the like. Further, in the case of imprinting the date or other extra information on the image, in order to reproduce only the peripheral portion thereof as the hard tone, the timing control may be done to vary the developing bias. In addition, the switching may be similarly done among any number of steps in accordance with the gradients.

The console panel of the image processing apparatus to control the image processing will now be described.

Figure 7:
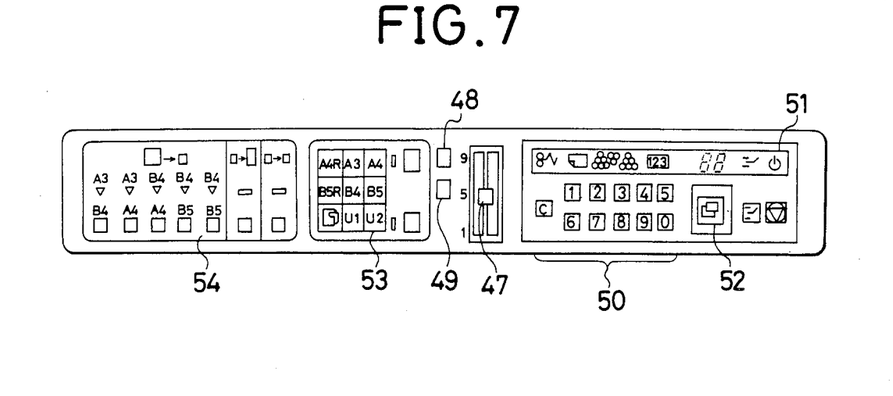
FIG. 7 is a diagram showing an example of a console panel of the image processing apparatus.

FIG. 7 shows an example of the console panel of the copying machine. A lever 47 is used to adjust the original density. By moving the lever 47 to a proper position in accordance with the density of the original, the density of the image which is copied is adjusted. For example, in the case of an original whose whole surface is relatively dark such as a blue-copy original, the lever 47 is moved in the direction indicated by 1. On the other hand, in case of an original on which characters and the like are written with a pencil on a high quality paper, the lever 47 is moved in the direction of 9, so that a proper copy is obtained. A numeral 48 is a button to adjust the ordinary original density, and 49 is a button to adjust the density of the original having low reflectance. These buttons may be replaced by one key. The brightness of the light sources 11 and 80 in FIGS. 2-1 and 2-2 can be varied in accordance with the position of the lever 47. This method can be implemented by a well known technology such as, for instance, a method of controlling a firing angle of the halogen lamp or the like. Also, the light source 11 is turned on during the copying operation in a case where the button 49 for adjustment of the density of low reflectance original was depressed, while it is turned off even during the copying operation when the ordinary original density adjusting button 48 was depressed.

In addition, a numeral 50 indicates ten-key and clear key for setting the number of copy sheets; 51 is a various indicator section; 52 is a copy start key; 53 is a cassette size indicator section; and 54 is a variable magnification power setting section for setting and indicating the variable magnification mode.

Figure 8:
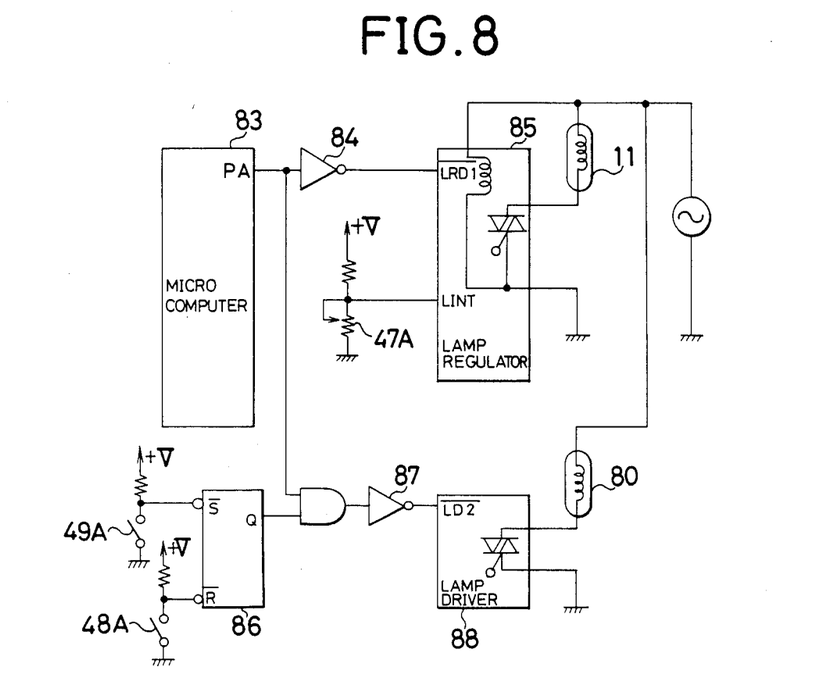
FIG. 8 is a diagram showing a density control circuit.

FIG. 8 shows a density control circuit.

An output port PA of a microcomputer 83 becomes "1" level when the light source 11 is on. An output of a hammer driver 84 is connected to a drive terminal LRD1 of a lamp regulator 85. When the output port PA is at "1" level, the drive terminal LRD1 becomes "0" level and an average current responsive to a voltage value at a photo-adjustment terminal LINT at this time flows through the light source 11, so that the light source is turned on. An output from a volume 47A which is interlocked with the lever 47 is connected to the photo-adjustment terminal LINT, so that by moving the lever 47 and varying a value of the volume 47A, the average current value flowing through the light source 11 is controlled and the light amount can be therefore changed. A switch 49A which is interlocked with the button 49 is connected to a set terminal $\bar{S}$ of an RS flip flop 86. A switch 48A which is interlocked with the button 48 is connected to a reset terminal $\bar{R}$. A hammer driver 87 is driven by AND of a Q output of the RS flip-flop 86 and the output port PA. A lamp driver 88 is driven by the hammer driver 87. With such an arrangement, for the time interval from the depression of the button 49 to the depression of the button 48, the lamp driver 88 is driven at the timing when the light source 11 is turned on, namely, at the timing when the output port PA becomes "1", so that a light source 80 is simultaneously lit on. Also, the light amount of the light source 80 may be controlled by the lever 47.

In the copying machine which adjusts the copy density by adjusting the light amount of the light source, the example has been shown in the above whereby another light source is added and turned on in response to the density adjusting button. However, a similar method can be also applied to the copying machines of the types whereby the DC component of the developing bias is varied and the diaphragm of the lens is changed. In addition, the diaphragm adjustment is used as the coarse adjustment and the light amount adjustment may be used as the fine adjustment. A combination of the two adjustments is also possible.

Moreover, it is also possible to adopt the method whereby the processing speed, namely, the traveling velocities of the drum and optical system are changed to effect the course adjustment. In other words, this method uses the fact that the exposure amount per unit time is increased with a reduction in speed of the drum.

Although the density is adjusted at two levels in the example of the invention, this may be adjusted to any number of levels.

In addition, the example has been shown whereby the density adjustment is performed by setting and resetting the RS flip-flop in dependence upon the state of the switch interlocked with the button for adjustment of the density; however, another construction is also possible wherein the density adjustment data is once input into the microcomputer and the determination regarding whether the hammer driver 87 is driven or not is made in accordance with the program.

What we claim is:

1. An image processing system for forming copy images comprising:
    a screen display on an original presser plate;
    a first mode for performing image processing with respect to the screen display on an original presser plate;
    a second mode for performing image processing with respect to a hard copy original;
    high gradient processing means for performing the image processing with a relatively high gradient;
    low gradient processing means for performing the image processing with a relatively low gradient; and
    switching means for switching said high gradient processing means and said low gradient processing means wherein said switching means switches a developing bias voltage, whereby said low gradient processing means and said high gradient processing means are switched by said switching means in accordance with the first and second modes.

2. An image processing system for forming copy images comprising:
    display means;
    image processing means for performing image processing and providing as an output a copy image on the basis of an original image taken either from hard copy or from an image displayed on said display means;
    adjusting means for adjusting a density of the copy image to obtain a desired density; and
    means for controlling said image processing means so as to obtain an appropriate density depending on whether the original image is taken either from hard copy or from said display means,
    whereby said adjusting means is operational regardless of the state of said control means.

3. An image processing system according to claim 2, wherein said adjusting means is a lever.

4. An image processing system according to claim 2, wherein said adjusting means has a constant scale irrespective of the control operation by said control means.

5. An image processing system according to claim 2 wherein said image processing means further comprises exposing means for exposing the original to a light and reading means for reading out the original on the basis of light reflected by the exposed original whereby said adjusting means adjusts the quantity of exposing light emitted by said exposing means.

6. An image processing system according to claim 2 wherein said image processing means further comprises reading means for reading out the original, latent image forming means for forming a latent image in response to information from said reading out means, and developing means for devloping said latent image formed by said latent image forming means, whereby said adjusting means adjusts a developing bias voltage of said developing means.

7. An image processing system for forming copy images comprising:
    display means;
    image reading means for digitally reading an original image taken either from hard copy or from an image displayed on said display means; and
    control means for differentially controlling the image reading operation depending on whether the original image is taken either from hard copy or from an image from said image display screen and read out by said image reading means.

8. An image processing means according to claim 7 wherein said image reading means comprises a placing plate, including a display, for placing an origianal image thereon and pressing means for pressing said original on said placing plate, and said image reading means reads out the original image on said placing plate.

9. An image processing system according to claim 7 wherein said image reading means comprises exposing means for exposing the hard copy to light and reading out the original image on the basis of light reflected by the original image.

10. An image processing system according to claim 9 wherein said reading operation indicates a quantity of light incident on the original image and said control means increases the quantity of light upon exposing the original image when taken from a displayed image.

11. An image processing system for forming copy images comprising:
    display means;
    image reading means for digitally reading an original image taken either from hard copy or from an image displayed on said display means;
    control means for differentially controlling an image forming operation depending on whether the original image is taken either from hard copy or from an image from said display means.

12. An image processing system according to claim 11 wherein said image forming means comprises latent image forming means for forming a latent image and developing means for developing said latent image, whereby said control means varies a developing bias voltage depending on whether the original image is taken either from hard copy or from said display means.

13. An image processing system according to claim 11 wherein said image reading means comprises a placing plate, including a display, for placing an original image thereon and pressing means for pressing said original image on said placing plate, whereby said image reading means reads out said original image on said placing plate.

14. An image processing system for forming copy images comprising:
    display means;
    image forming means for forming a copy image of an original image taken either from hard copy or from an image displayed on said display means;
    first adjusting means for adjusting a density of the copy image upon the formation of the copy image from hard copy;
    second adjusting means for adjusting the density of the copy image upon the formation of the copy image from an image displayed on said display means;

switching means for selecting either said first or second adjusting means; and control means for controlling said first and second adjusting means.

15. An image processing system according to claim 14 wherein said control means is manually adjustable.

16. An image processing system according to claim 14 wherein said image forming means comprises a plate for placing an original image thereon, a pressing plate for pressing the original image on said original placing plate, exposing means for exposing the original image on said placing plate to a light, reading means for reading out the original image on the basis of light reflected by the orignal image, latent image forming means for forming a latent image in response to information from said reading means and developing means for developing the latent image formed by said latent image forming means, wherein said pressing plate includes a display.

17. An image processing system according to claim 16 wherein said first and second adjusting means adjust a developing bias voltage of said developing means.

18. An image processing system according to claim 16 wherein said first and second adjusting means adjust a quantity of exposing light of said exposing means.

19. An image processing apparatus for forming copy images of first and second types of original images requiring respective different copying conditions to produce copies of a desired copy image density comprising:

image processing means for forming a copy image from an original image;

means for controlling said image processing means to provide coarse adjustment of the copy image density in accordance with the type of the original image to be reproduced; and means for selectively varying the copy image density to provide fine adjustment of the copy image density independent of the coarse adjustment.

20. An image processing system according to claim 19 wherein said varying means comprises a manually movable adjustment lever.

21. An image processing system according to claim 19 wherein said varying means provides a range of density variation which by virtue of the operation of said control means is appropriate for the different types of orignal images.

22. An image processing system according to claim 19 wherein said controlling means comprises switching means operable when there is a change from one form of original to another.

23. An image processing system according to claim 22 wherein said processing means comprises a latent image carrier and a developing device for developing a latent image formed on said latent image carrier, and said switching means switches between different developing bias voltages applied to said developing device.

24. An image processing system according to claim 22 wherein said processing means comprises an illumination means for illuminating an original and projecting an image light onto a photosensitive member, and wherein said switching means switches between different levels of image light projection.

25. An image processing system according to claim 24 wherein said illumination means includes means for adjusting the diaphragm of a projection lens for the illuminating light, and switching means effects operation of said diaphragm adjustment means.

26. An image processing system according to claim 22 wherein said switching means switches between first and second light sources providing different levels of original illumination.

27. An image processing system according to claim 26 wherein said illumination means comprises first and second light sources and wherein said mode switching comprises switching between eighter (i) said first light source or (ii) said first and second light sources combined.

28. An image processing system according to claim 22 wherein said image processing means further comprises a rotatable photosensitive member and means for projecting an image light illuminating said photosensitive member with light reflected by the original image, and wherein said processing means comprises drive means for driving the photosensitive member relative to said projection means, said switching means switching between different relative speeds of said photosensitive member and said projection means.

29. An image processing system according to claim 19 further comprising a display means adapted to display one of said different types of original image.

30. An image processing system according to claim 29 wherein said display means is a liquid crystal display panel.

31. An image processing system according to claim 29 wherein said display means is incorporated in a cover member of the image processing apparatus which is arranged to hold the sheet flat on said support.

32. An image processing system according to claim 19 further comprising means adapted to support a sheet bearing the original image to be copied.

33. An image processing system according to claim 19 wherein said image processing means includes image reading means for digitally reading the original image.

34. An image processing system according to claim 19 wherein said image processing means further comprises means for receiving image data transmitted to said processing unit from another processing unit and forming a copy image therefrom.

35. An image processing system according to claim 34 further comprising a display means capable of displaying an image using the transmitted data.

36. An image processing system according to claim 19 wherein said processing unit further comprises means for transmitting image data obtained by reading an original image to another processing unit.

* * * * *